United States Patent
Lefley

(10) Patent No.: US 8,558,604 B2
(45) Date of Patent: Oct. 15, 2013

(54) DEMODULATION MIXING FOR A NEAR FIELD COMMUNICATIONS (NFC) DEVICE

(75) Inventor: Alastair Lefley, Kemble (GB)

(73) Assignee: Broadcom Innovision Limited, Cambridge, Cambridgeshire (GB)

( * ) Notice: Subject to any disclaimer, the term of this patent is extended or adjusted under 35 U.S.C. 154(b) by 186 days.

(21) Appl. No.: 13/203,183

(22) PCT Filed: Feb. 25, 2010

(86) PCT No.: PCT/GB2010/050328
§ 371 (c)(1),
(2), (4) Date: Nov. 8, 2011

(87) PCT Pub. No.: WO2010/097629
PCT Pub. Date: Sep. 2, 2010

(65) Prior Publication Data
US 2012/0126877 A1   May 24, 2012

(30) Foreign Application Priority Data
Feb. 25, 2009 (GB) .................................. 0903157.6

(51) Int. Cl.
*G06G 7/12* (2006.01)
(52) U.S. Cl.
USPC ........................................................ 327/355
(58) Field of Classification Search
USPC ........................................................ 327/355
See application file for complete search history.

(56) References Cited

U.S. PATENT DOCUMENTS 5,142,553 A    8/1992  Rosenkranz
2008/0089445 A1*  4/2008  Kuo et al. .................... 375/327

FOREIGN PATENT DOCUMENTS

| WO | WO 2006/123170 |         | 11/2006 |
|----|----------------|---------|---------|
| WO | WO 2007/099512 | A1      | 9/2007  |
| WO | WO 2008/117029 |         | 2/2008  |
| WO | WO 2010/097629 | A1      | 9/2010  |

OTHER PUBLICATIONS

International Search Report directed toward related International Application No. PCT/GB2010/050328 mailed Jun. 14, 2010, European Patent Office, Rijswijk, The Netherlands; 4 pages.
International Preliminary Report on Patentability and Written Opinion direct toward related International Application No. PCT/GB2010/050328 mailed Aug. 30, 2011, European Patent Office, Rijswijk, The Netherlands; 5 pages.
Ru et al., "On the Suitability of Discrete-Time Receivers for Software-Defined Radio," IC-Design Group, CTIT, University of Twente, Enschede, The Netherlands, *IEEE*, (2007); pp. 2522-2525.

(Continued)

*Primary Examiner* — Daniel Rojas
(74) *Attorney, Agent, or Firm* — Sterne, Kessler, Goldstein & Fox P.L.L.C.

(57) ABSTRACT

An in-phase, quadrature phase (IQ) mixer for a near field communications (NFC) device is disclosed that includes a signal provider that provides an in-phase (I) mixing signal and a quadrature phase (Q) mixing signal so that the period of the I mixing signal is equal to a period for the Q mixing signal. A controller is configured to control the signal provider so that the average of the I mixing signal over two periods is minimized and the average of the Q mixing signal over two periods is also minimized. The controller is also configured to control the signal provider so that the average propagation delay for the I mixing signal and the Q mixing signal is minimized individually and relative to each other.

20 Claims, 5 Drawing Sheets

(56) References Cited

OTHER PUBLICATIONS

International Standard: ISO/IEC 21481, *Information technology—Telecommunications and informationa exchange between systems—Near Field Communication Interface and Protocol—2(NFCIP-2)*, pp. 1-12, First edition, Reference No. ISO/IEC 21481:2005(E), ISO/IEC (Jul. 2005).

International Standard: ISO/IEC 18092, *Information technology—Telecommunications and information exhange between systems—Near Field Communication—Interface and Protocol (NFCIP-1)*, pp. 1-66, First Edition, Reference No. ISO/IEC 18092:2004(E), ISO/IEC (Apr. 2004).

International Standard: ISO/IEC 14443, *Identificaion cards—Contactless integrated circuit cards—Proximity cards, Part 4: Transmission protocol*, pp. 1-46, Second edition, Reference No. ISO/IEC 14443-4:2008(E), ISO/IEC (Jul. 2008).

International Standard: ISO/IEC 15693, *Identificaion cards—Contactless integrated circuit cards—Vicinity cards—Part 3: Anticollision and transmission protocol*, pp. 1-51, First edition, Reference No. ISO/I EC 15693-3:2001 (E), ISO/IEC (Apr. 2001).

* cited by examiner

DEMODULATION MIXING FOR A NEAR FIELD COMMUNICATIONS (NFC) DEVICE

CROSS-REFERENCE TO RELATED APPLICATIONS

This application is a National Stage of International Application No. PCT/GB2010/050328, filed on Feb. 25, 2010, which claims the benefit of Great Britain Patent Application No. 0903157.6, filed on Feb. 25, 2009.

BACKGROUND OF THE INVENTION

The present invention relates to near field RF communicators and NFC communicators comprising demodulation circuitry having digital signal mixers and to devices comprising such communicators and to digital signal mixing for demodulation, in particular to digital signal mixing for demodulation.

Near field RF (radio frequency) communication is becoming more and more commonplace as is the use of such technology to transfer data. Near field RF communicators communicate through the modulation of the magnetic field (H field) generated by a radio frequency antenna. Near field RF communication thus requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

NFC communicators are a type of near field RF communicator that is capable in an initiator mode of initiating a near field RF communication (through transmission or generation of an alternating magnetic field) with another near field RF communicator and is capable in a target mode of responding to initiation of a near field RF communication by another near field RF communicator. The term "near field RF communicator" includes not only NFC communicators but also initiator near field RF communicators such as RFID transceivers or readers that are capable of initiating a near field RF communication but not responding to initiation of a near field RF communication by another near field RF communicator and target or responding near field RF communicators such as RFID transponders or tags that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

In addition NFC communicators may be associated with or comprised within or attached to certain peripheral devices, for example SIM cards (e.g. UICC), Secure Elements, memory devices (for example MCU, RAM, ROM and non-volatile memory), display driver or other drivers. During operation the NFC communicator must also be able to communicate with and transfer data to and from such peripheral device.

There are several standards in existence which set out certain communication protocols and functional requirements for RFID and near field RF communications. Examples are ISO/IEC 14443, ISO 15693, ISO/IEC 18092 and ISO/IEC 21481.

NFC communicators may be comprised within a larger device, NFC communications enabled devices. Examples include mobile telephones, PDAs, computers, smart cards. When comprised within such NFC communications enabled devices the NFC communicator must be able to transfer data to and from the larger device and to and from any peripheral devices (including interface systems, such as the single wire protocol) associated with such larger device.

A modulated signal comprises a data signal modulated on to a carrier signal. Data may be modulated on to a carrier signal according to a pulse position modulation scheme and/or amplitude modulation scheme. In the case of digital signal encoding, such schemes are sometimes referred to as phase shift keying and amplitude shift keying respectively. Some modulation schemes, such as quadrature amplitude modulation, are equivalent in effect to a mixture of amplitude and phase modulation. To extract a data signal from a modulated signal (that is to demodulate the signal) it has been proposed to mix the modulated signal with two mixing signals having a phase delay of 90° between the two signals. This is referred to as in-phase, quadrature-phase mixing, or IQ-mixing. Phase information about the modulated signal can then be derived based on the relative signs and magnitudes of the in-phase and quadrature-phase mixed signals. In other examples, other (smaller) phase shift angles may be used to provide higher order encoding.

Where the phase angle between mixing signals is not accurately known (for example where the phase angle between the I and Q mixing signals is not 90°) the demodulation may be compromised.

In digital signal processing it has been proposed to derive mixing signals by down-sampling a high frequency clock signal. To provide a phase delay of exactly a quarter of a cycle (90°) between mixing signals at the carrier frequency the frequency of the clock signal should be an exact multiple of four times the carrier frequency, i.e. it should be possible to provide a quarter cycle phase shift in an integer number of clock cycles. For example, if the frequency of the clock signal is 24 times higher than the required mixing signals, it is possible to obtain two such mixing signals each offset from the other by one quarter of a cycle of the carrier (6 cycles of the clock signal) by down-sampling the clock signal by a factor of 24. An example of this process is shown in FIG. 5.

The inventors in the present case have appreciated that, where a clock signal is not a multiple of 4 times greater than the required mixing frequency, then it is not possible to obtain the required quarter cycle phase-offset in the mixing signals from an integer number of cycles of the clock signal.

One manifestation of this problem is that the phase shift between the in-phase (I) and quadrature phase (Q) mixing signals is not a perfect quadrature (90° or $\pi/2$) shift and/or the duty cycle of the signals may be spoilt, for example the time integral of one or both of the mixing signals (or the product of the two) may be non zero over a whole number of cycles. In other words, the orthogonality condition upon which accurate IQ demodulation depends is not met because of discretization errors.

SUMMARY OF THE INVENTION

Aspects and examples of the invention are set out in the claims. Embodiments of the invention enable the provision of mixing signals having a predictable phase and duty cycle in systems where the available clock signal frequency is not under the control of the demodulator. These embodiments of the invention provide compatibility between demodulators according to the invention and other devices with which they are to be used and that circuitry adapted for the purpose of generating a clock signal at a particular required frequency is not necessary. As will be appreciated such circuitry may increase the size, complexity and power demands of demodulation circuitry.

Embodiments of the present invention are particularly advantageous in applications such as near field RF communication, and particularly for NFC communication where constraints may be placed on power consumption and semiconductor real-estate by a host device in which a near field communicator is to be installed or in which near field communications functionality is to be provided.

BRIEF DESCRIPTION OF THE DRAWINGS

Embodiments of the invention will now be described in greater detail by way of example only, with reference to the accompanying drawings, in which.

DETAILED DESCRIPTION OF THE INVENTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collection(s) of integrated circuits.

Figure 1:
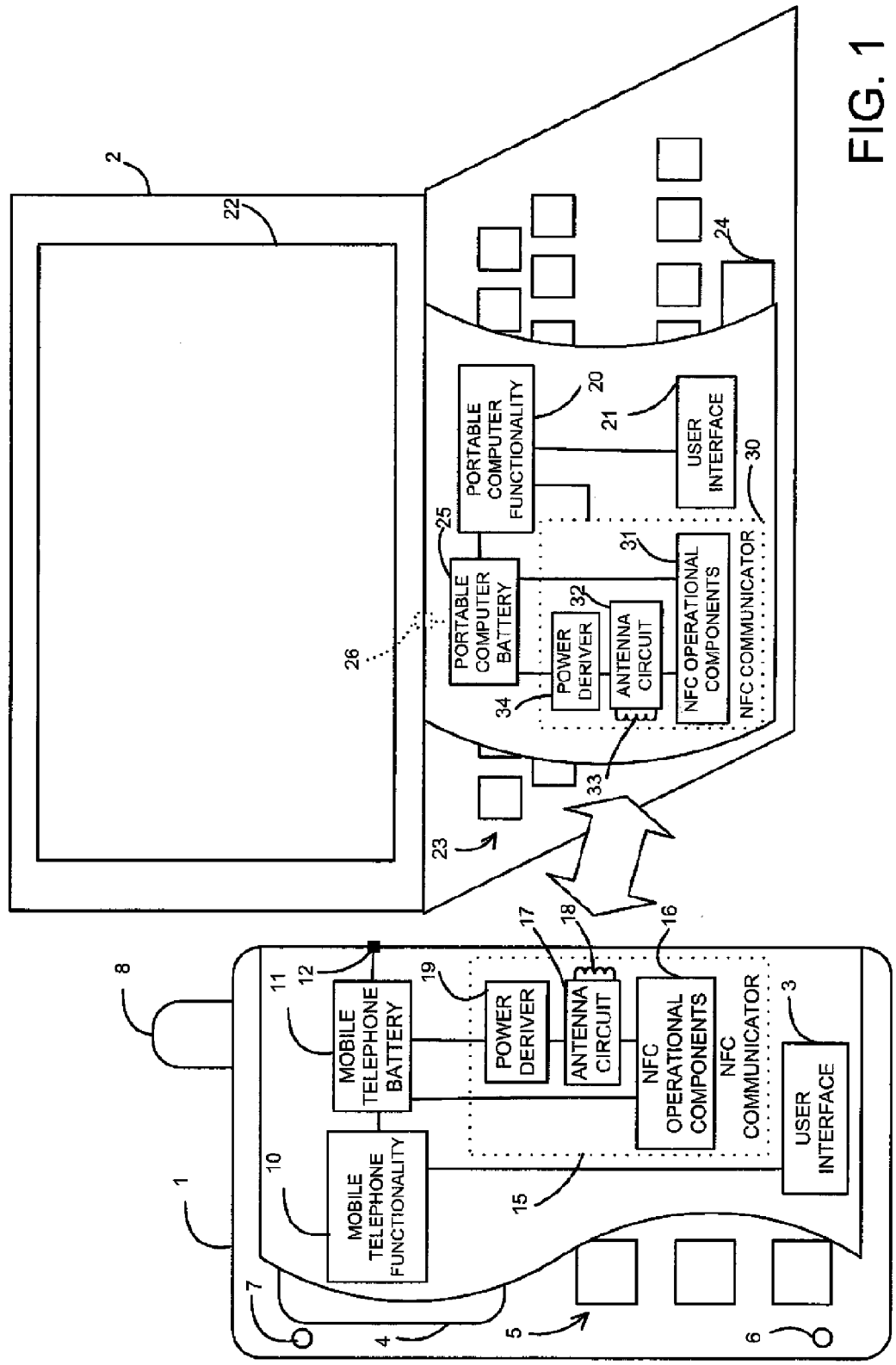
FIG. 1 shows a representational diagram illustrating communication between two devices comprising NFC communicators.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery. The chargeable battery 11 forms the primary power supply for the mobile telephone and NFC communicator 15. Given it is chargeable, it can designed to be removed at certain times and/or to be charged in situ.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25. Again the chargeable battery 25 is the primary power supply for the portable computer and NFC communicator 30.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an antenna circuit 17 and 32 comprising an inductor or coil in the form of an antenna 18 and 33. The antenna circuits 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. One or both of the power providers 19 and 34 may comprise a coupling to derive power from the corresponding device battery 11 or 25 i.e. the primary power supply.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device. As another possibility the NFC communicator (15 or 3) may be comprised within or coupled to a peripheral device, for example in the form of a smart card or other secure element which may be stand alone or comprised within or intended to be inserted into another electrical device. For example a SIM card for use in a mobile telephone. As a further possibility such peripheral devices may comprise interfacing systems or protocols such as the single wire protocol.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
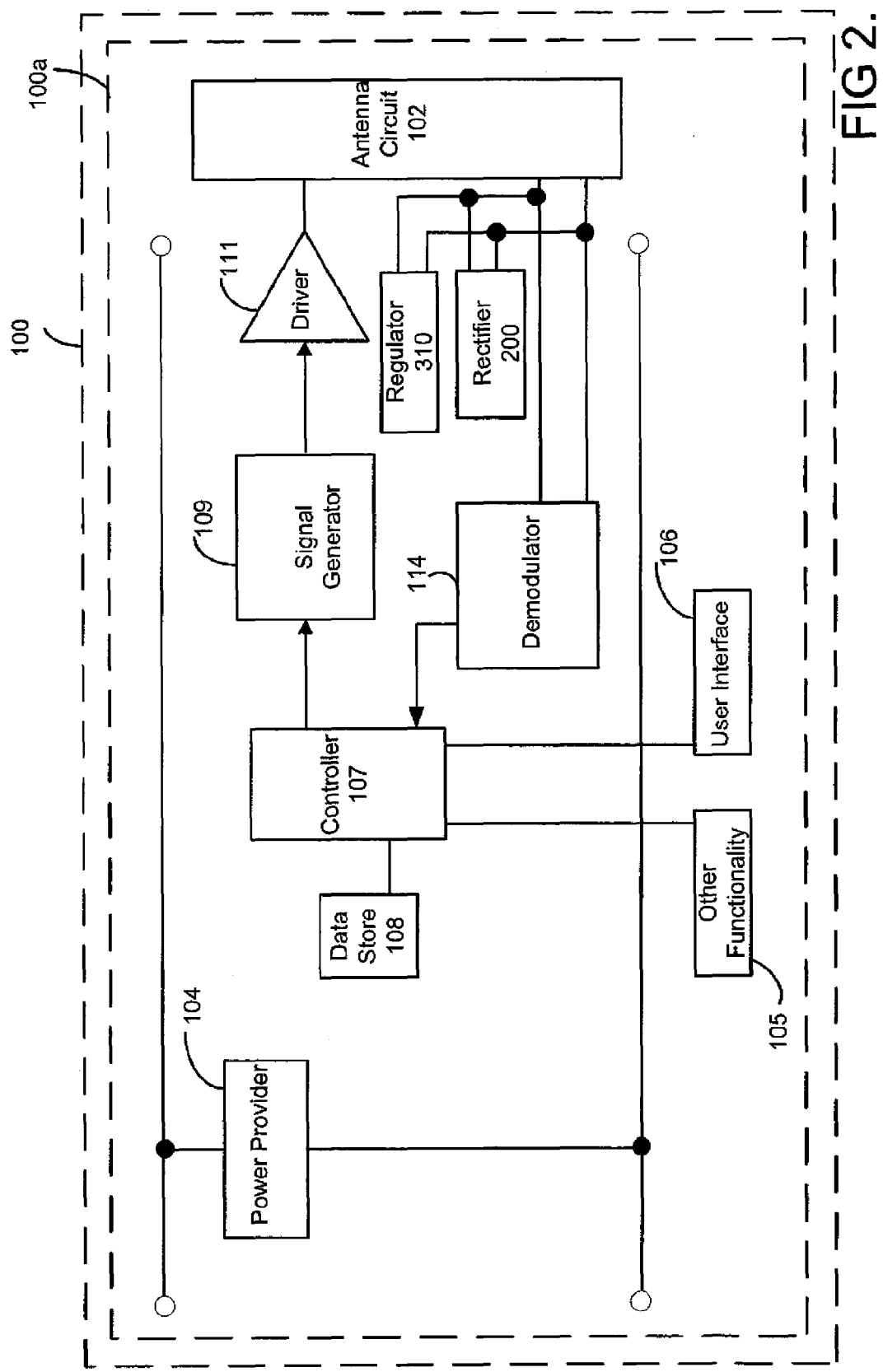
FIG. 2 shows an embodiment of an NFC communicator according to an aspect of the present invention.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NEC communications enabled device 100 comprises an NFC communicator 100*a* having NFC operational components including an antenna circuit 102, power provider 104, controller 107, data store 108, signal generator 109 and demodulator 114.

The power provider 104 may be any one or more of the types of power providers discussed above. In the interests of simplicity, power supply couplings from the power provider 104 to other components are not shown in FIG. 2.

The NFC communications enabled device 100 may or may not also have or be capable of being connected or coupled with at least one of other functionality 105 (for example functionality of a host device or peripheral device such as described above) and a user interface 106.

The NFC operational components include a demodulator 114 coupled between the antenna circuit 102 and the controller 107 for demodulating a modulated RF signal inductively coupled to the antenna circuit 102 from another near field RF communicator in near field range and for supplying the thus extracted data to the controller 107 for processing. Rectifier 200 is coupled to provide a rectified output to regulator 310. Rectifier 200 and regulator 310 are coupled to the outputs AC1 and AC2 of the antenna circuit. The regulator 310 sets or regulates a voltage supply level (pin voltage) and the rectifier 200 provides a rectified voltage to the remainder of the NFC circuit. The regulator 310 sets or regulates the voltage between the outputs AC1 and AC2 of the antenna circuit based on the voltage supply level (pin voltage) provided by the rectifier 200. As shown the demodulator 114 is coupled to the antenna circuit outputs AC1 and AC2. As another possibility the demodulator may receive its input from the regulator 310. As a further possibility, the demodulator may receive its input from the rectifier 200.

Together the rectifier 200 and regulator 310 protect the NFC operational components from high voltages received at antenna circuit 102. For example the regulator may limit the voltage to 3.3 or 1.8 volts. Any suitable regulator and rectification circuit may be used. The NFC operational components may also include an amplifier for amplifying an RF signal inductively coupled to the antenna circuit 102.

In addition the NFC operational components include components for enabling modulation of an RF signal to enable data to be communicated to another near field RF communicator in near field range of the NFC communicator 100*a*. As shown in FIG. 2, these components comprise a signal generator 109 coupled via a driver 111 to the antenna circuit 102. The NFC communicator may use any appropriate modulation scheme that is in accordance with the standards and/or protocols under which the NFC communicator operates. As another possibility a separate or further signal controller may be incorporated within the NFC operational components to control modulation of the signal generated by the signal generator 109 in accordance with data or instructions received from the controller 107.

The NFC operational components also include a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC communicator 100*a* may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. NFC communicators commonly operate at or around 13.56 MHz.

When in initiator or target mode, the NFC communicator may communicate in accordance with an active or passive protocol. When using an active protocol, the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

In FIG. 2 control of operation of the NFC communicator is through controller 107. As another possibility, where the NFC communicator is part of a host device, control of the operation of the NFC communicator may be directed by the host device, for example through other functionality 105. In such circumstances all or part of the control may be provided by other functionality 105. For example the NFC communicator controller 107 may control modulation and modulation protocols whereas the data to be transmitted may be provided by other functionality 105.

The NFC communicator also comprises an antenna circuit 102. The design of the antenna circuit will depend on the NFC communicator 100 and the environment in which it operates. For example the antenna circuit may be in the form described for co-pending international patent application number PCT/GB2008/000992 (which claims priority from GB 0705635.1).

Figure 3:
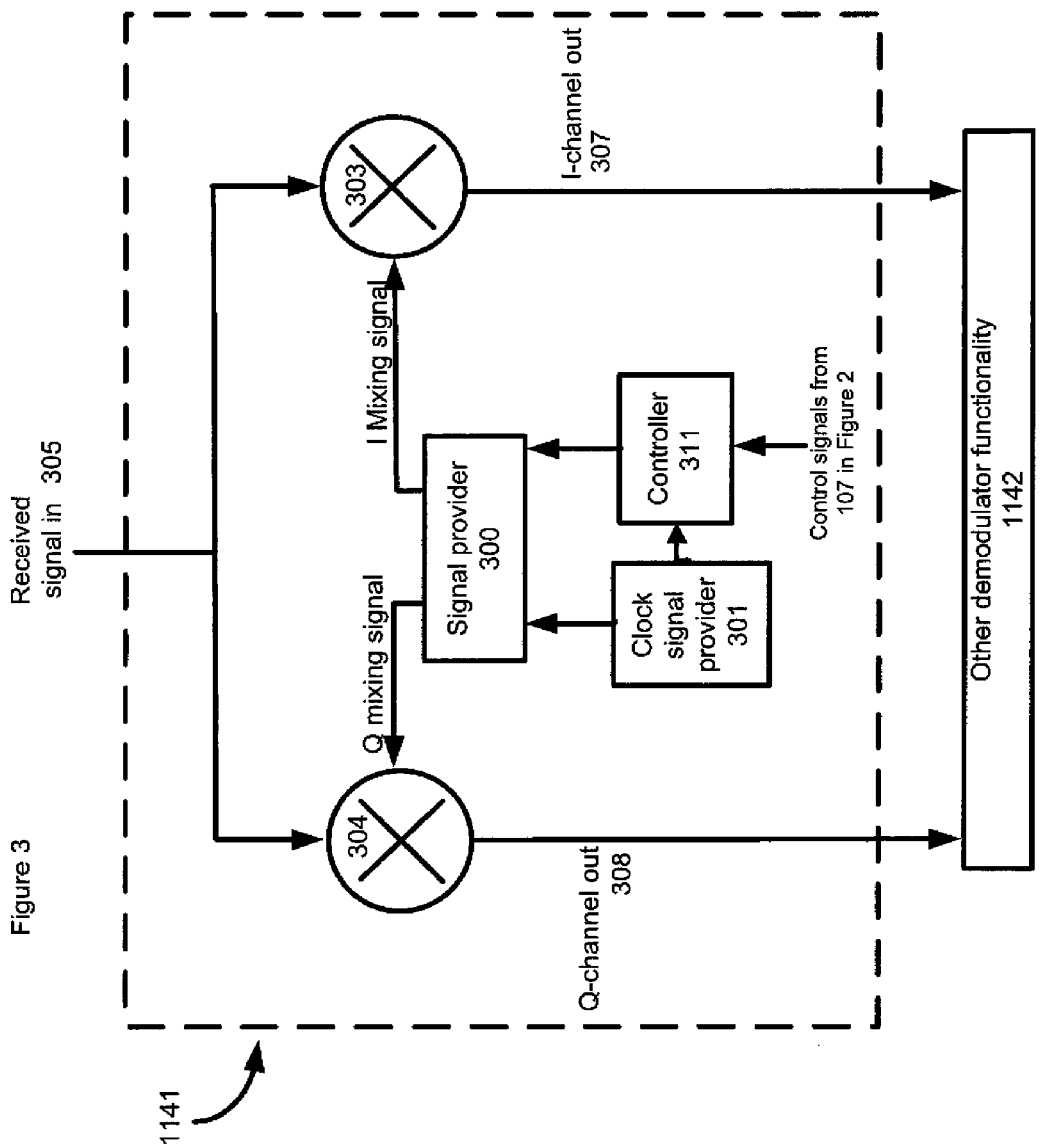
FIG. 3 shows a functional block diagram of a quadrature mixing signal provider.

Demodulator 114 in FIG. 2 comprises an IQ mixer 1141 in FIG. 3. The methods and apparatus set forth herein are described with reference to near field RF communicators and NFC communicators, in which they provide particular advantages. However these methods and apparatus are generally advantageous and their use is in no way limited to near field communicators or NFC communicators.

FIG. 3 shows a schematic functional block diagram of an IQ-mixer 1141 having a received signal input 305 and two signal outputs 307, 308. In the schematic diagram of FIG. 3 the received signal 305 and the output signals 307, 308 are shown as 'single ended' signals but, as will be appreciated, they may also be differential signals.

The IQ mixer 1141 comprises: a signal provider 300 having a clock signal input, and two mixing signal outputs; and a clock signal provider 301 having a clock signal output coupled to provide a clock signal to the signal provider 300 and to a controller 311. Controller 311 is coupled to control signal provider 300. Each mixing signal output is coupled to a signal mixer, 303, 304. In addition, each signal mixer is coupled to the received signal input 305 and to one of the signal outputs 307, 308. The mixed signals 307, 308 are coupled to other demodulator functionality 1142 which performs other demodulation functions to extract a data signal from the I-mixed and Q-mixed signals.

Digital mixers 303 and 304 perform multiplication of the received signal with the signal from the signal provider 300. The mixing signals may be digital signals which take a value of high (+1) or low (−1), thus multiplication can be performed by the mixers 303 304 if they are configured so that: when the input from signal provider 300 is high the received signal 305 is passed on to the output of the mixer 303, 304 un-altered; and when the input from signal provider 300 is low the received signal 305 is inverted at the output of the mixer 303, 304.

Controller 311 is coupled to the controller of the NFC communicator (107 in FIG. 2) to receive control data relating to the desired frequency of the I and Q mixing signals. Controller 311 is operable to determine a pattern of signal samples based on control information received from controller 107 and on the clock signal from the clock signal provider 301. Controller 311 is further operable to control signal provider 300 to provide signal samples in accordance with the determined pattern of signal samples.

In the interests of clarity, signal mixers 303 and 304 have been shown as separate units, as will be appreciated this diagram is schematic. In practice mixers 303, 304 may be implemented in a single unit. Similar remarks apply to the other structures shown in FIG. 3 and each may be implemented in a discrete unit or as part of an integrated unit. For example, optionally controller 311 is part of controller 107 in FIG. 2. Any or all of the functionality indicated in the drawings may be provided in separate units or in one or more integrated units.

The operation of an IQ mixer according to FIG. 3 will now be described in greater detail with reference to the timing diagrams shown in FIGS. 4 to 8.

Controller 311 receives a clock signal from the clock signal provider and control information, such as a desired mixing frequency from the controller 107 of the NFC communicator. Based on the clock signal and the frequency of the desired mixing signal the controller 311 determines whether the duration of one quarter of a cycle of the desired mixing signal is equivalent to an integer number of cycles of the clock signal.

Figure 4:
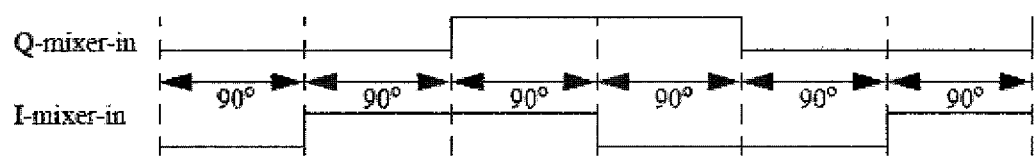
FIG. 4 shows a timing diagram illustrating idealized quadrature behaviour of I and Q mixing signal
Figure 5:
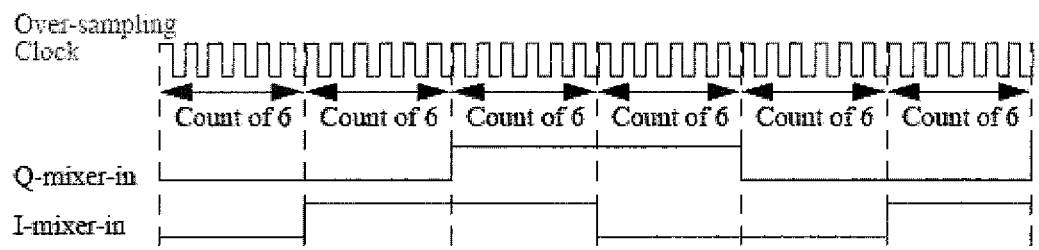
FIG. 5 shows a timing diagram illustrating down-sampling of an oversampled clock to provide I and Q mixing signals.

In the event that controller 311 determines that the clock signal frequency is an integer multiple of four times greater than the frequency of the required mixing signals I, Q, then controller 311 controls signal provider 300 to provide mixing signals I and Q as illustrated in FIG. 4. In the example of FIG. 4 the clock signal frequency is 24 times the desired mixing signal frequency so controller 311 controls the signal provider 300 to provide an I mixing signal which changes state (from high to low, or low to high) on the $1^{st}$, $13^{th}$, $25^{th}$, $37^{th}$, $49^{th}$, $61^{st}$, $73^{rd}$ (etc.) cycles of the clock signal and the Q signal could be based on the $7^{th}$, $19^{th}$, $31^{st}$, $43^{rd}$, $55^{th}$, $67^{th}$, $79^{th}$ (etc.) cycles of the clock signal. This is illustrated in FIG. 5, which shows a clock signal adjacent I and Q mixing signals generated as described above. In the example of FIG. 5 the frequency of the clock signal is 24 times greater than the frequency of the required I and Q mixing signals and the I and Q signals are delayed from each other by 6 cycles of the clock signal to provide a one quarter cycle, 90° (or $\pi/2$) phase shift. This represents the ideal case and is described to illustrate why a 4 times over-sampled clock is generally desirable.

Figure 6:
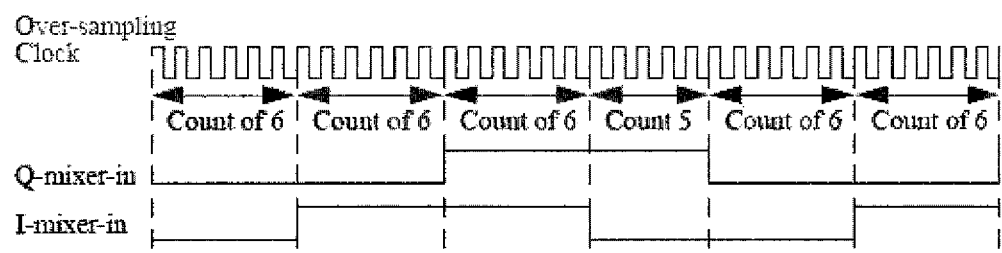
FIG. 6 shows a timing diagram illustrating down-sampling of an oversampled clock to provide I and Q signals in which the clock frequency is not a multiple of 4 times greater than the frequency of the required in-phase (I) and quadrature-phase (Q) mixing signals.

FIG. 6 illustrates the problem of a clock signal having a frequency which is a non-integer multiple of four times the desired mixing frequency, in the example of FIG. 6 the clock frequency is 23 times the frequency of the desired mixing signals I, Q. As shown in FIG. 6, one scheme for providing mixing signals in this circumstance proceeds as follows. The controller 311 controls the signal provider 300 to provide an I signal which changes from a low state to a high state on the $12^{th}$ clock cycle and from a high to a low state on the $23^{rd}$ clock cycle (of each 23 clock cycles) and so on. The controller 311 controls the signal provider 300 to provide a Q signal which changes from a low state to a high state on the $6^{th}$ clock cycle (of each 23 clock cycles) and from a high to a low state on the $18^{th}$ clock cycle (of each 23 clock cycles). Thus, the Q signal is high for 11 clock cycles and low for 12 clock cycles whilst the I signal is high for 12 clock cycles and low for 11 clock cycles. As a result the phase shift between the two signals varies throughout each cycle so that it is 94° between rising edges of the I and Q signals and 78° between falling edges of the I and Q signals.

To address the discretisation error illustrated in FIG. 6 the controller 311 controls the signal provider 300 to provide a pattern of high, low or null, (i.e. +1, −1 or zero), output signal samples. To determine the desired output pattern the controller 311 determines the half cycle time of the desired mixing signals as an integer number of clock signal periods (i.e. divides the half cycle time of the desired mixing signals by the clock signal period and rounds down to the nearest integer). This integer division of half the mixing signal period by the clock signal period gives the integer half cycle time. The controller 311 controls the signal provider to provide a signal which, during any given cycle of the required mixing signal, is high for the integer half cycle time, low for the integer half cycle time and null for the remainder of each period of the desired mixing signal. This has the advantage that the mixing signals are high for the same number of clock cycles as they are low. This null insertion can be accomplished by any appropriate method, for example, following each rising edge of the signal a counter is incremented for each sample (clock cycle) that the signal is high, then the counter is decremented for each sample (clock cycle) during which the signal is low. Once the counter reaches zero the signal is set to a null value until the end of a period of the required mixing signals. Other possibilities for providing appropriate null insertion to correct the duty cycle of the mixing signals will be apparent to the skilled practitioner in the context of having read the present disclosure.

Figure 7:
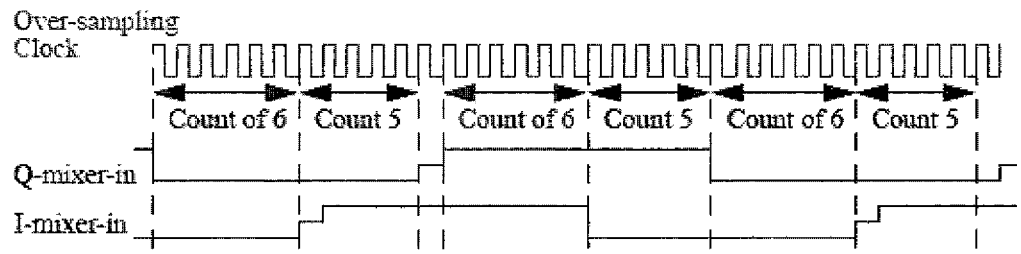
FIG. 7 shows a timing diagram illustrating a first scheme for down-sampling of an oversampled clock, based on sample insertion.

As shown in FIG. 7 a residual phase error between the derived I and Q signals remains: the delay between each rising edge of I and the next rising edge of Q is 5 counts (78°); the delay between each falling edge of Q to the next rising edge of I is 7 counts (110°); the delay between the centre of the high and low intervals of each signal varies between 11 and 12 counts each cycle (172°-188°).

Figure 8:
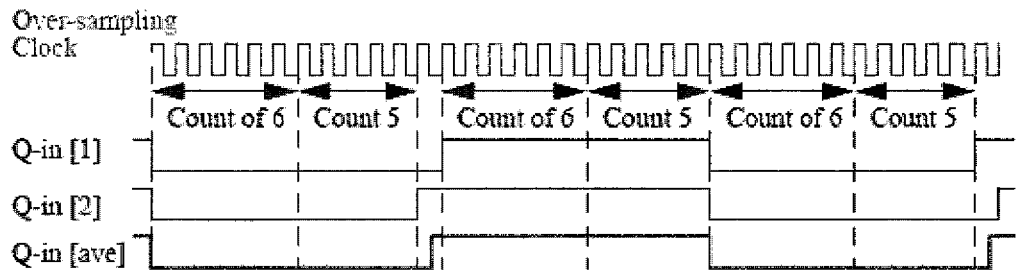
FIG. 8 shows a timing diagram illustrating a second adjusted scheme for down-sampling of an oversampled clock, based on time-domain averaging; and, FIG. 9 shows a timing diagram illustrating a second adjusted scheme for down-sampling of an oversampled clock, based on time-domain averaging and sample insertion.

Controller 311 can be configured to control signal provider 300 to generate signal samples such that the average of the signal over an even number of periods is minimized. This is achieved by considering each pattern of samples for the mixing signals, I and Q over an even number of periods. For example, as shown in FIG. 8, the controller 311 controls the signal provider to generate samples such that: a first cycle of a mixing signal, Q-in[1], has an initial low interval of 12 counts (cycles of the clock signal) followed by a high interval of 11 counts; and such that, a second cycle of the mixing signal Q-in[2] has an initial low interval of 11 counts followed by a high interval of 12 counts. When the resultant mixing signal is considered over 2 complete periods it can be seen that: (1) the average of the mixing signal over two periods, or any integer multiple thereof, is zero; and (2) the average propagation delay over the same period (the delay between one falling edge of Q-in to the next rising edge of Q-in) is 11.5 counts. Thus, by configuring the controller 311 and signal provider 300 to generate signal samples so as to minimise the average of each mixing signal over an even number of signal periods the propagation delay of each signal is kept constant when considered over that interval.

To enable the average delay between I and Q signals generated in this way to be one quarter cycle (quadrature) the controller minimises the average of each series (I and Q) of samples over an interval of four cycles. By this method, one of the two signals can be delayed relative to the other by an average of one quarter of a cycle. As will be appreciated having read the present disclosure, the exact nature of this adjustment is dependent on the mismatch between the carrier frequency and the clock frequency.

Figure 9:
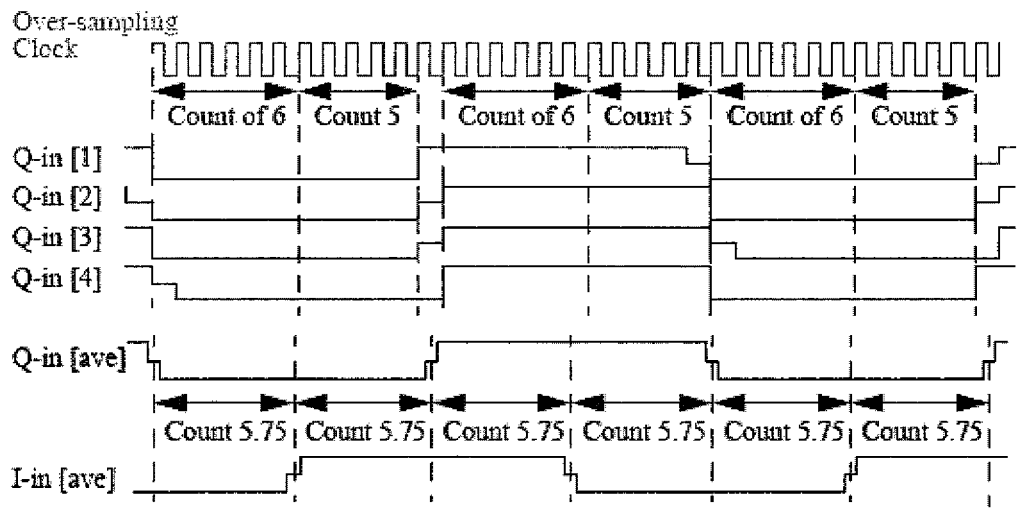

The methods described above can be combined by controlling the signal provider 300 to provide a signal which, during any given cycle of the required mixing signal has a constant duty cycle and a constant propagation delay as described above with reference to FIG. 6 and such that the average of each mixing signal over an even number of signal periods is minimized as described above with reference to FIG. 7. The resulting mixing signals each have a duty cycle of 0.5 and a desired phase shift with respect to the other mixing signals. The result of combining these two methods is shown in FIG. 9 for an example which the clock frequency is 23 times the desired mixing signal frequency. As will be appreciated an equivalent principle applies where the clock frequency is any other multiple of the desired mixing signal frequency. As shown in FIG. 9 the controller 311 controls the signal provider 300 to provide: a first cycle of the Q signal, Q-in[1], which is low for 11 samples, then high for 11 samples, then null for a single sample; a second cycle of the Q signal, Q-in[2], which is low for 11 samples, null for one sample, then high for 11 samples; a third cycle of the Q signal, Q-in[3], which is low for 11 samples, null for one sample, then high for 11 samples; and, a fourth cycle of the Q signal, Q-in[4] which is null for one sample, low for 11 samples, then high for 11 samples. Thus Q-in[1], Q-in[2], Q-in[3] and Q-in[4] each meet the single cycle condition of being high for the same number of clock cycles as it is low and, taken over any sequence of four subsequent periods the propagation delay and duty cycle is constant.

The resultant average quadrature-phase and in-phase signals taken over 4 cycles, Q-in[ave] and I-in[ave] respectively have a constant propagation delay, a constant duty cycle and an inter-signal delay (phase shift) of one quarter of a cycle.

In one possibility, the invention could be used coupled to any suitable apparatus, for example in combination with the processing circuitry shown in FIG. 2 of International application WO2006/123170 the entirety of which is hereby incorporated by reference. As will be appreciated this would require appropriate modifications to that circuitry such as, for example, the analogue to digital converters within the demodulation circuitry could be replaced by a single analogue to digital converter to convert to a digital signal prior to coupling to the demodulation processor. Other appropriate modifications will be apparent to the skilled man.

As will be appreciated from reading International application WO2006/123170 the clock signal may be controlled by the controller of an NFC communicator or a clock signal may be derived from a controller of a host device comprising an NFC communicator or a separate clock signal provider may be incorporated as shown in FIG. 3.

As used herein the propagation delay of a single signal is the interval between corresponding rising and falling signal features in an oscillatory signal, for example from one rising edge of a signal to the next falling edge of the signal.

In examples of near field RF communicators such as NFC communicators a clock signal may be derived from a clock signal of a host. In these examples the clock signal has a constant clock rate, or a clock rate that is not under the control of the NFC communicator. Embodiments of the present invention may be particularly advantageous in these circumstances because they may enable the near field RF communicator to operate with any sufficiently high frequency clock signal.

A signal provider or signal generator of apparatus embodying the invention operates according to at least one of the schemes described herein to provide mixing signals having a required signal delay.

As will be appreciated the present invention is not limited to the provision of quadrature signals and may be used to provide mixing signals having phase offsets of any arbitrary phase angle.

As will be appreciated the present invention is not limited to near field RF or NFC applications but may be of use in any communications device having a requirement for an oversampled clock signal.

The invention claimed is:

1. An in-phase, quadrature-phase (IQ) mixer, comprising:
    a signal provider configured to provide an in-phase (I) mixing signal and a quadrature-phase (Q) mixing signal, wherein a period for the I mixing signal is equal to a period for the Q mixing signal;
    a controller configured to control the signal provider so that:
        the I mixing signal is at a first level for an equal number of clock cycles during the period as is the Q mixing signal,
        the I mixing signal is at a second level for an equal number of clock cycles during the period as is the Q mixing signal, and
        the I mixing signal is at a null for an equal number of clock cycles during the period as is the Q mixing signal, wherein the null is equal to a remainder of the period that the I mixing signal and the Q mixing signal are not at the first level or the second level; and
    a clock signal provider configured to provide a clock signal to the signal provider and the controller, wherein the clock cycles are derived from the clock signal.

2. The IQ mixer of claim 1, further comprising:
    a first signal mixer configured to multiply a received signal with the I mixing signal; and
    a second signal mixer configured to multiply the received signal with the Q mixing signal.

3. The IQ mixer of claim 2, wherein the first signal mixer is further configured to:
    provide the received signal unaltered when the I mixing signal is at the first level; and
    invert the received signal when the I mixing signal is at the second level.

4. The IQ mixer of claim 2, wherein the second signal mixer is further configured to:
    provide the received signal unaltered when the Q mixing signal is at the first level; and
    invert the received signal when the Q mixing signal is at the second level.

5. The IQ mixer of claim 1, wherein the controller is further configured to:
    determine whether a duration of one-quarter of the period for the I mixing signal and the Q mixing signal is equivalent to an integer number of clock cycles derived from the clock signal.

6. The IQ mixer of claim 5, wherein the controller is further configured to:
    multiply the duration of one-quarter of the period for the I mixing signal and the Q mixing signal by two to generate a duration of one-half of the period for the I mixing signal and the Q mixing signal; and
    round down the duration of one-half of the period to a nearest integer to generate a half cycle time for the I mixing signal and the Q mixing signal when the duration of one-quarter of the period for the I mixing signal and the Q mixing signal is not equivalent to the integer number of clock cycles.

7. The IQ mixer of claim 6, wherein the controller is further configured to control the signal provider so that:
    the I mixing signal is at the first level for the half cycle time and at the second level for the half cycle time;
    the Q mixing signal is at the first level for the half cycle time and at the second level for the half cycle time; and
    the I mixing signal and the Q mixing signal are at the null for a difference between the period of the I mixing signal and the Q mixing signal and a clock signal period.

8. An in-phase, quadrature-phase (IQ) mixer, comprising:
    a signal provider configured to provide an in-phase (I) mixing signal and a quadrature-phase (Q) mixing signal, wherein a period for the I mixing signal is equal to a period for the Q mixing signal;
    a controller configured to control the signal provider so that:
        an average of the I mixing signal, at a first level for a first quantity of clock cycles and at a second level for a second quantity of clock cycles, over a first I mixing signal period and a second I mixing signal period is minimized,
        an average propagation delay for the I mixing signal over the first I mixing signal period and the second I mixing signal period is minimized,
        an average of the Q mixing signal, at the first level for the first quantity of clock cycles and at the second level for the second quantity of clock cycles, over a first Q mixing signal period and a second Q mixing signal period is minimized, and
        an average propagation delay for the Q mixing signal over the first Q mixing signal period and the second Q mixing signal period is minimized; and
    a clock signal provider configured to provide a clock signal to the signal provider and the controller, wherein the clock cycles are derived from the clock signal.

9. The IQ mixer of claim 8, wherein the average of the I mixing signal, at the first level for the first quantity of clock cycles and at the second level for the second quantity of clock cycles, over the first I mixing signal period and the second I mixing signal period is zero.

10. The IQ mixer of claim 8, wherein the average of the Q mixing signal, at the first level for the first quantity of clock cycles and at the second level for the second quantity of clock cycles, over the first Q mixing signal period and the second Q mixing signal period is zero.

11. The IQ mixer of claim 8, wherein the average propagation delay for the I mixing signal is determined from an average of a first propagation delay for the I mixing signal over the first I mixing signal period and a second propagation delay for the I mixing signal over the second I mixing signal period.

12. The IQ mixer of claim 8, wherein the average propagation delay for the Q mixing signal is determined from an average of a first propagation delay for the Q mixing signal over the first Q mixing signal period and a second propagation delay for the Q mixing signal over the second Q mixing signal period.

13. The IQ mixer of claim 12, wherein an average propagation delay for the I mixing signal and the average propagation delay for the Q mixing signal is one-quarter of a clock cycle.

14. An in-phase, quadrature-phase (IQ) mixer, comprising:
a signal provider configured to provide an in-phase (I) mixing signal and a quadrature-phase (Q) mixing signal, wherein a period for the I mixing signal is equal to a period for the Q mixing signal;
a controller configured to control the signal provider so that:
  an average of the I mixing signal at a first level for a first quantity of clock cycles and at a second level for a second quantity of clock cycles over a first I mixing signal period and a second I mixing signal period is minimized,
  an average propagation delay for the I mixing signal over the first I mixing signal period and the second I mixing signal period is minimized based on the I mixing signal being at a I mixing signal null,
  an average of the Q mixing signal at a first level for a first quantity of clock cycles and at a second level for a second quantity of clock cycles over a first Q mixing signal period and a second Q mixing signal period is minimized, and
  an average propagation delay for the Q mixing signal over the first Q mixing signal period and the second Q mixing signal period is minimized based on the Q mixing signal being at a Q mixing signal null; and
a clock signal provider configured to provide a clock signal to the signal provider and the controller, wherein the clock cycles are derived from the clock signal.

15. The IQ mixer of claim 14, wherein the I mixing signal null is equal to a remainder of the first I mixing signal period and the second I mixing signal period that the I mixing signal is not at the first level or the second level.

16. The IQ mixer of claim 14, wherein the Q mixing signal null is equal to a remainder of the first Q mixing signal period and the second Q mixing signal period that the Q mixing signal is not at the first level or the second level.

17. The IQ mixer of claim 15, wherein the average propagation delay of the I mixing signal is based on an average of when the I mixing signal is at the I mixing signal null.

18. The IQ mixer of claim 16, wherein the average propagation delay for the Q mixing signal average is based on an average of when the Q mixing signal is at the Q mixing signal null.

19. The IQ mixer of claim 14, wherein the average of the I mixing signal at the first level for the first quantity of clock cycles and at the second level for the second quantity of clock cycles over the first I mixing signal period and the second I mixing signal period is zero.

20. The IQ mixer of claim 14, Wherein the average of the Q mixing signal at the first level for the first quantity of clock cycles and at the second level for the second quantity of clock cycles over the first Q mixing signal period and the second Q mixing signal period is zero.

* * * * *

UNITED STATES PATENT AND TRADEMARK OFFICE
CERTIFICATE OF CORRECTION

PATENT NO. : 8,558,604 B2  Page 1 of 1
APPLICATION NO. : 13/203183
DATED : October 15, 2013
INVENTOR(S) : Alastair Lefley It is certified that error appears in the above-identified patent and that said Letters Patent is hereby corrected as shown below:

Title Page, Item (57), Abstract, replace "a quadrature phase" with --a quadrature-phase--.

In the Claims

Claim 20, column 14, line 22, replace "claim 14, Wherein" with --claim 14, wherein--.

Signed and Sealed this
Fourth Day of March, 2014

Michelle K. Lee
*Deputy Director of the United States Patent and Trademark Office*